Patented Oct. 25, 1949

2,485,911

UNITED STATES PATENT OFFICE 2,485,911

PETROLEUM EXTRACT-SULFUR DIOXIDE REACTION PRODUCT

Eric Sylvester Narracott, Sunbury-on-Thames, England, assignor to Anglo-Iranian Oil Company Limited, London, England, a British joint-stock corporation No Drawing. Application May 1, 1945, Serial No. 591,421. In Great Britain May 9, 1944

6 Claims. (Cl. 260—79.3)

The invention relates to protective coatings such as paints, varnishes and like compositions, and one of its objects is to employ a substitute material, for the resins or synthetic resins customarily used in their preparation. Another object is to produce paints and varnishes of high durability with regard to wearing and weathering qualities.

Many different coating compositions are known that are compounded from a large variety of substances, but some contain a drying oil, the properties of which are modified by the presence of a resinous substance or substances, while diluents, pigments, fillers, driers, waxes or other substances are added according to the purpose for which the finished composition is required.

I have found now that a satisfactory varnish or other coating composition may be produced in which the sole film-forming substance is a soft resin obtained by the sulphur dioxide treatment of hydrocarbon extracts as indicated hereinafter. Thus, according to the invention a coating composition is produced in which the film-forming substance consists solely, mainly or partially of a soft resin so obtained.

The starting material in the production of these soft resins is a lubricating oil base derived from a crude petroleum. This base material is first de-waxed, if it contains wax, and the wax free material is solvent extracted, primarily for the production of a raffinate for use as a lubricating oil or lubricating oil constituent. The extract is thus a by-product in the production of lubricating oils, and hitherto has been used for other purposes and mainly for inclusion in fuel oils. The solvent is removed from the extract phase in known manner and a hydrocarbon extract obtained having a molecular weight within the range 200–800, and preferably within the range 250–750.

When such an extract is itself used in the production of paints and varnishes, either in place of resins or as a film plasticiser, the finished material shows poor durability, particularly with respect to weathering qualities.

The extract so obtained is then treated with sulphur dioxide at elevated temperatures for a prolonged period, and the resulting resin is subjected to a final treatment to clarify it. A straight film of such a resin will pass the weathering test in the War Emergency British Standard 1057 (1942) for substitute paints.

According to the invention therefore a wax free lubricating oil base is first extracted with a selective polar solvent or a mixture of solvents one at least of which is of a polar character, as for example a mixture of sulphur dioxide and benzol. The desired hydrocarbons are to be found in the extract phase and are obtained by removal of the solvent by distillation. The material so obtained is treated with up to 25% of its weight of sulphur dioxide at a temperature within the range 150–300° C., and preferably within the range 180–280° C., for a period up to 50 hours.

Atmospheric pressure is satisfactory and is generally to be preferred, although satisfactory results may also be obtained at superatmospheric pressure. The resulting soft resin may then be given a final clarifying treatment according to known methods such as for example distillation, treatment with porous earths, or like materials, or precipitation with solvents.

The following is an example of process conditions that may be usefully employed:

*Example.*—100 parts by volume of a residue from a crude petroleum of Iranian origin, having a boiling range 420–675° C. at 760 mm. Hg were treated with 400 parts by volume of an 80/20 mixture of sulphur dioxide/benzol in a multi-stage counter-current unit operated under a temperature gradient of from 40° F. at the cold end to 130° F. at the hot end. The solvent was removed from the extract phase by distillation to give a 25% yield of a predominantly aromatic hydrocarbon extract, having a boiling range of 420–650° C. and a mean molecular weight of 420. The specific gravity was 1.06, and the viscosity at 200° F. was 240 centistokes.

The extract so obtained was treated with sulphur dioxide at 220° C., 7.6% by weight of sulphur dioxide being employed during a reaction time of 8 hours. The resinous product had a softening point (ring and ball) of 92.5° C., and an approximate molecular weight of 1300.

The resinous product was dissolved in naphtha, and the solution poured on a metal panel. After evaporation of solvent, the film of material on the metal panel was submitted to the 250-hours accelerated weathering test of British Standard 1057 (1942) which it passed successfully, whereas a comparative test on the original extract resulted in a failure at about 60 hours.

I claim:

1. A process of producing a resin for use in producing coating compositions, consisting in reacting a predominately aromatic hydrocarbon extract obtained in the solvent extraction of a wax-free lubricating oil base derived from crude petroleum, the extract having a molecular weight in the range 200–800, with a proportion of from about 7.6% up to about 25% of its weight of sulphur dioxide, at a temperature within the range 150–300° C. for a period of from about 8 hours up to 50 hours, and the resin recovered as a product.

2. A process as specified in claim 1, in which the hydrocarbon extract treated has a molecular weight within the range 250–750.

3. A process as specified in claim 1, in which the treatment with sulphur dioxide is carried out at a temperature in the range 180–280° C.

4. A process as specified in claim 1, in which the treatment with sulphur dioxide is carried out at substantially atmospheric pressure.

5. A process of producing a resin for use in producing coating compositions, consisting in reacting a hydrocarbon extract of predominately aromatic character obtained in the solvent extraction of a wax-free lubricating oil base of boiling range approximately 420°–675° C. derived from crude petroleum, and having a boiling range of about 420°–650° C. and a mean molecular weight of approximately 420, with a proportion of approximately 7.6% of its weight of sulphur dioxide at a temperature of approximately 220° C. and at approximately atmospheric pressure for a period of approximately 8 hours, and a resin having a softening point (ring and ball) of approximately 92.5° C and a molecular weight of approximately 1300 recovered as a product.

6. A resinous material being a derivative product of the process which consists in reacting a predominately aromatic hydrocarbon extract obtained in the solvent extraction of a wax-free lubricating oil base derived from crude petroleum, and having a molecular weight in the range 200–800, with a proportion of from about 7.6% to 25% of its weight of sulphur dioxide at a temperature within the range 150°–300° C. and at approximately atmospheric pressure for a period of from about 8 hours up to 50 hours.

ERIC SYLVESTER NARRACOTT.

REFERENCES CITED

The following references are of record in the file of this patent:

UNITED STATES PATENTS

| Number | Name | Date |
|---|---|---|
| 2,220,714 | Hersberger | Nov. 5, 1940 |
| 2,247,371 | Harrison | July 1, 1941 |
| 2,294,027 | Frey et al. | Aug. 25, 1942 |